(No Model.)
R. LUCKENBACH.
FUNNEL.
No. 579,649.　　　　　　　　　Patented Mar. 30, 1897.
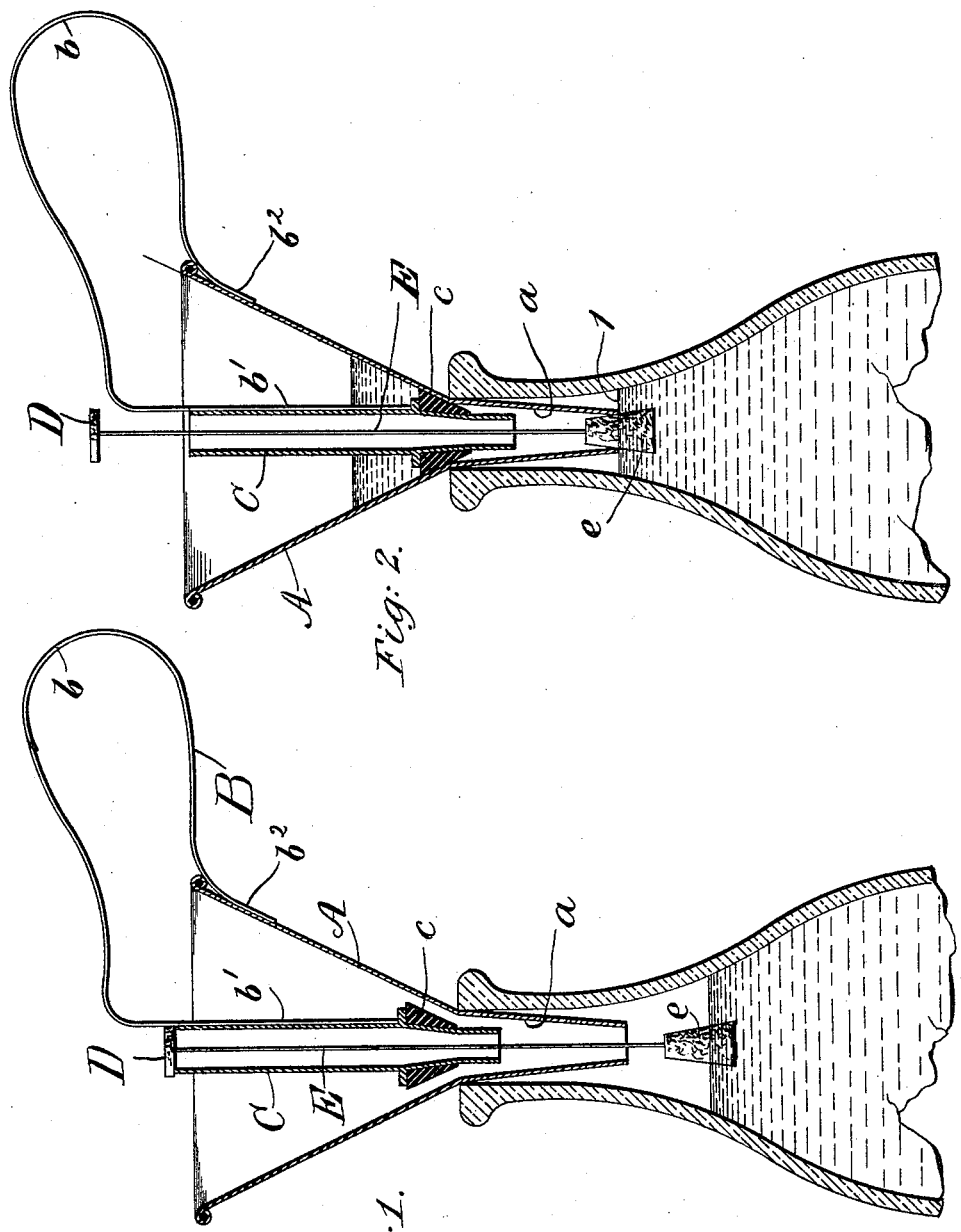
WITNESSES:
INVENTOR

United States Patent Office.

ROYER LUCKENBACH, OF PHILADELPHIA, PENNSYLVANIA, ASSIGNOR TO J. W. MOHN, OF SAME PLACE.

FUNNEL.

SPECIFICATION forming part of Letters Patent No. 579,649, dated March 30, 1897.

Application filed July 24, 1896. Serial No. 600,354. (No model.)

*To all whom it may concern:*

Be it known that I, ROYER LUCKENBACH, a citizen of the United States, and a resident of Philadelphia, county of Philadelphia, and State of Pennsylvania, have invented certain new and useful Improvements in Funnels, of which the following is a specification, reference being had to the accompanying drawings, forming a part thereof, in which similar letters of reference indicate corresponding parts.

This invention relates to an improvement in funnels, the object thereof being to supply an article of this character with means for automatically preventing overflow of liquid from a bottle or other receptacle being filled, a further object being to retain surplus liquid in the funnel-body without danger of leakage therefrom while transferring the funnel from one receptacle to another. The device comprises few and simple parts, and it is inexpensive and durable.

The invention will be hereinafter fully described, and specifically set forth in the annexed claims.

In the accompanying drawings, forming part of this specification, Figure 1 is a vertical sectional elevation of my improved funnel, showing the same in position within the neck of a bottle during the process of filling the same; and Fig. 2 is a similar view illustrating the position of the operative parts of the funnel after the bottle is filled.

In the practice of my invention I provide, primarily, an ordinary conical or other shaped funnel-body A, which said body has a tubular and preferably conical stem $a$ projecting from the bottom thereof.

To the upper edge of the body A, at any point upon the circumference thereof, is secured a handle B, which said handle comprises a spring-bow $b$, a depending arm $b'$, and a projection $b^2$ for securing the handle to the body of the funnel. This said handle is preferably composed of a single strip of resilient metal.

Attached to the arm $b'$ of the handle B is a tube C, adapted to act as a vent for the funnel. Upon the lower end of this said tube is secured a valve $c$, which is adapted to engage with the outlet portion of the funnel-body for preventing the outflow of liquid therefrom.

Engaging with the upper end of the tube C is a head D, which said head is preferably of rectangular contour in plan for allowing escape of air around the same. Depending from this head is a rod E, which has a valve $e$ secured to the lower end thereof, which said valve is adapted to be seated within the lower end of the funnel-stem $a$.

The rod E is preferably composed of aluminium, and its head may be composed of aluminium, cork, or any other light-weight material, and the valve $e$ is preferably composed of cork, but a hollow aluminium valve may be used.

In the operation of the device the funnel will be placed within the neck of a bottle, as illustrated in Fig. 1 of the drawings. Liquid matter will then be introduced thereto through the funnel-body into the bottle until the said bottle is filled to a height approximating the line 1 in Fig. 2 of the drawings, when the valve $e$ will float upwardly and into the lower end of the stem $a$ and seat itself, whereby further outflow of liquid from the funnel-body will be prevented. Then, in order to retain the surplus liquid in the funnel-body, an operator will contract the spring-loop E until the valve $c$ is securely seated within the outlet of the funnel-body. The funnel can then be transferred to another bottle, and by releasing pressure from the loop the valve will open and the liquid will continue to flow, as described above.

I do not confine myself to the specific details of mechanical construction as herein described, as it is obvious that under the scope of my invention I am entitled to slight variations of structure.

Having thus described my invention, what I claim as new, and desire to secure by Letters Patent, is—

1. In a funnel, the combination of a funnel-body having a stem depending therefrom and a tube leading centrally therethrough, said tube connected to a spring-bow which acts as a handle for the funnel, and a valve secured to the said tube and a rod extending through said tube having a float-valve upon the lower end thereof, said float-valve adapted to close the outlet of the funnel-stem, substantially as shown and described.

2. The combination of a funnel comprising a body and a conical stem, and a valve adapted to close the outlet of the funnel-body and a tube extending through the said valve and a spring-bow connected to the said tube for maintaining it in a normally upward position, and a rod depending normally from the upper edge of the said tube, said rod having a float-valve upon the lower end thereof for engagement with the outlet of the funnel-stem, substantially as shown and described.

In testimony that I claim the foregoing as my invention I have signed my name, in presence of two witnesses, this 14th day of July, 1896.

ROYER LUCKENBACH.

Witnesses:
EDWARD FELL LUKENS,
H. D. MACKENZIE.